United States Patent Office.

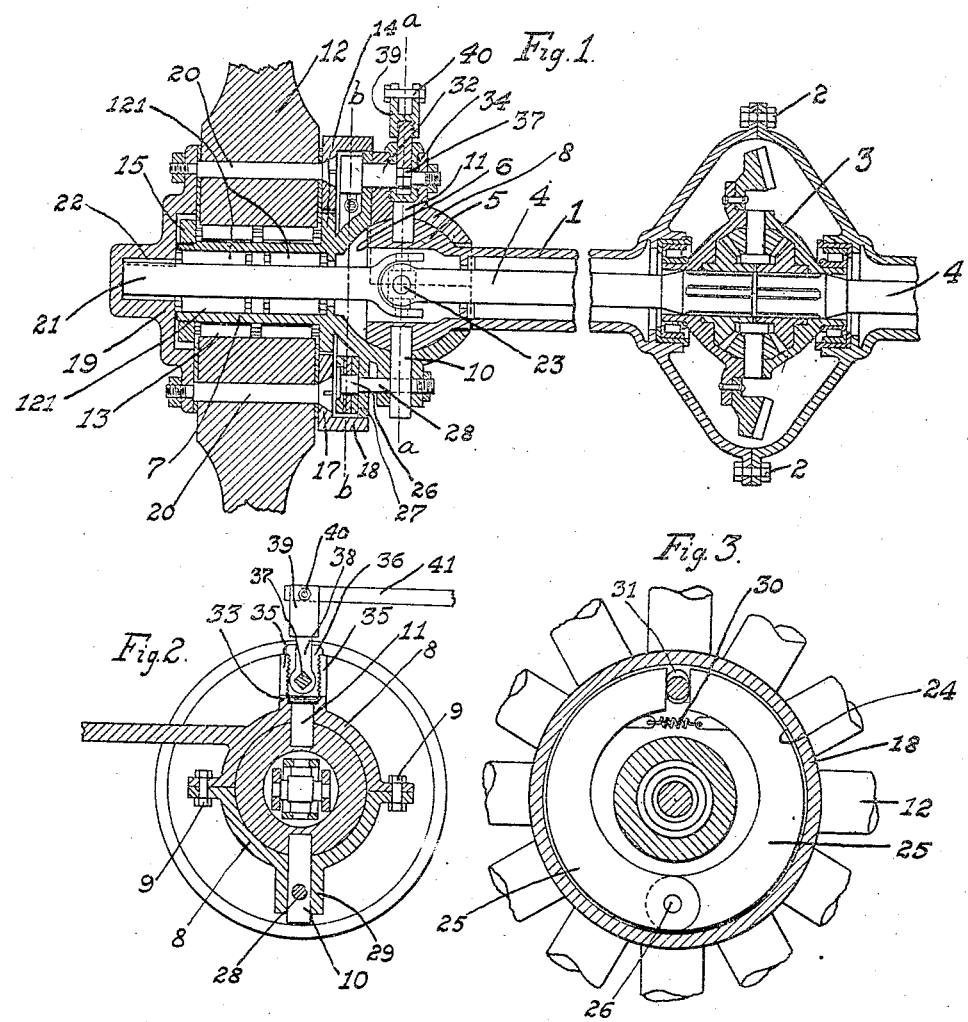

JOHN F. FROMM, OF ROCHESTER, NEW YORK.

MOTOR-VEHICLE.

1,186,179.  Specification of Letters Patent.  Patented June 6, 1916.

Original application filed May 28, 1915, Serial No. 30,954. Divided and this application filed January 7, 1916. Serial No. 70,780.

*To all whom it may concern:*

Be it known that I, John F. Fromm, of Rochester, in the county of Monroe and State of New York, have invented a new and useful Motor-Vehicle, fully set forth in the following specification and shown in the accompanying drawings.

The present invention relates to motor vehicles and more particularly to the type employing swinging hollow spindles on which the wheels turn, the driving mechanism for the wheel being extended through the spindles to connect with the wheels, an object of this invention being to improve the spindle construction and also to provide improved braking appliances for the wheels operating on the latter in any position or at any angle they may turn.

To these and other ends, the invention consists in certain parts and combinations of parts all of which will be hereinafter described, the novel features being pointed out in the appended claims.

In the drawings: Figure 1 is a sectional view through a stationary axle housing showing the wheel mounted thereon, with the present improvements embodied in the illustrated structure; Fig. 2 is a section on the line a—a, Fig. 1; and Fig. 3 is a section on the line b—b, Fig. 1.

Referring more particularly to the drawings, 1 indicates the stationary axle casing of a front or rear axle of an automobile, this casing, in the present instance, being formed in two parts, secured together by bolts 2 and inclosing a differential gearing 3 which connects with the two sections of a shafting or turning axle 4 also mounted within the stationary axle casing 1. The outer end of each section of the axle casing is preferably provided with a spherical enlargement 5, which is cut off at 6 at the extreme end of the housing 1. For engagement with each of said spherical enlargements 5, there is provided a hollow spindle 7, said spindle having preferably a spherical socket portion 8 formed of two parts connected by bolts 9. This spherical socket portion 8 is mounted to turn on the spherical portion 5 about a vertical axis, this being effected by two separate pivot pins 10 and 11 which are arranged in axial alinement. On the outer end of the spindle 7, the wheel 12 is mounted to turn preferably upon interposed bearings 13, the wheel being confined on the spindle between an annular flange 14ª on the spindle, and a nut 15 engaging external threads on the extreme outer end of the spindle.

Secured to the inner face of the wheel, is a ring or annular member 17 having a lateral flange 18 forming a braking member, while secured to the outer face of the wheel 12, is a disk 19, bolts 20 extending through the wheel and serving as a common securing means for the ring 17 and the disk 19.

The disk or hub plate 19 may have a central pocket into which one end of a stub shaft 21 projects, the stub shaft being connected to the disk by a key 22 which permits the disk to be removed from the stub shaft 21 but serves as a means for communicating motion from the stub shaft 21 to the wheel 12. A knuckle or universal joint 23 connects the stub shaft 21 with the shaft 4 and is located in line with the turning axis of the hollow spindle 7 so that the spindle and the stub shaft 21 may swing together, bearings 121 being interposed between the spindle and the stub shaft.

The braking appliances for the wheel embody preferably an internal annular braking surface 24 formed on the inner face of the flange 18 and turning with the wheel 12. For coöperation with this annular braking surface, braking members are provided preferably in the form of two curved or segmental braking members 25 mounted on a common pivot 26 which extends from the inner face of an annular flange 27 surrounding the spherical socket portion 8, said flange fitting within the flange 18 and providing a substantially closed chamber for inclosing the braking members 25. It is preferred to make the pivot 26 integral with a pin or bolt 28, which extends through a tubular portion 29 on the spherical socket portion 8 and also through the pivot pin 10, so that a single fastener is employed for anchoring the pivot pin 10 and supporting the braking members 25. The braking members 25 are preferably moved away from braking position by a spring 30 which connects the braking members above the spherical side portion.

For operating the braking members, there may be provided an elongated body 31 mounted between the ends of the braking members 25 and rotatable to turn the braking members on their pivot 26. In this instance, this rotary operating member has a stem 32 which turns in the flange 27 and extends through a boss or tubular portion 33 formed on the spherical socket portion 8. The interior walls of this boss 33 are threaded and are engaged by a screw threaded portion 34 on the pivot pin 11 so that the bolt or pin 32 also serves to hold the pivot pin 11 against turning. Opposite side walls of the tubular boss 33 are preferably provided with slots 35 and the screw threaded portion 34 is also provided with a slot 36 which registers with the slots 35. Within the slot 36, the pin or bolt 32 is provided with a squared portion 37 which is engaged by an arm 38 which, when swung within the slots 35 and 36, turns the pin 32 which, in turn, moves the elongated body 31 between the ends of the braking members 25. On one end of the arm 38, a head 39 is secured by screw threads loosely turning on the arm or other means which will permit the arm 38 to turn about the pivot pins 10 and 11 as a center. To the head 39, an operating connection, of which only the rod 41 is shown, may be connected by means of the bolt 40. This operating connection may lead to the seat of the vehicle and may connect with all of the wheels of the vehicle for the purpose of simultaneously braking all of such wheels.

The operation of the invention will be understood from the foregoing but it may be summarized as follows: The axle or shaft 4 is turned by the differential 3 and transmits motion through the knuckle joint 23 to the stub shaft 21 which, in turn, transmits motion through the hub cap 19 to the wheel 12 on the swinging spindle 7. The steering of the wheel is effected through the arm 42 extending laterally from the pivoted spindle and connected to the steering mechanism in any suitable manner. When the spindle swings, it turns on the pivot pins 10 and 11, and, should it be desired to brake the wheel, the arm 38 is swung by the brake-operating mechanism. This turns the pin 32 which, in turn, moves the elongated body 31 and shifts the brake members 25 on their common pivot 26, forcing said braking members outwardly against the annular braking surface 24.

A motor vehicle constructed in accordance with this invention will be strong and durable in use. The wheel may be quickly detached from the swinging spindle and the latter may be quickly and easily removed from the axle casing. The supporting and operating pins for the brake also act to fasten the pivot pins of the swinging spindle; and the operating pin of the brake, by intersecting the axis of the spindle, can be provided with a swinging arm in line with the axis of turning of the spindle.

The present application is a division of an application for a patent on a motor vehicle which was filed on May 28, 1915, Serial #30,954.

What I claim as my invention and desire to secure by Letters Patent is:

1. In combination, an axle casing, a hollow spindle mounted to swing thereon, a shaft in the axle casing, a stub shaft turning in the hollow spindle and having a universal joint connection with the shaft, a wheel mounted to turn on the spindle and connected with a stub shaft, a braking member on said wheel, and braking means on the hollow spindle embodying a rotary pin whose axis intersects the axis of turning of the hollow spindle and an operating arm rigid with and extending laterally from said rotary pin at the point of intersection of said axis by said pin.

2. In combination, an axle casing, a hollow spindle mounted to swing thereon, a shaft in the axle casing, a stub shaft turning in the hollow spindle and having a universal joint connection with the shaft, a wheel mounted to turn on the hollow spindle and connected to the stub shaft, a braking member on the wheel, a braking member on the hollow spindle, and means for operating the last named braking member into coöperation with the first named braking member comprising a rotary pin whose axis intersects the swinging axis of the hollow spindle, a swinging arm rigid with and extending laterally from said rotary pin in line with the swinging axis of the hollow spindle, a member rotatably connected to said arm to turn about an axis coincident with the length of the arm, and operating means connected to said rotary member.

3. In combination, an axle casing, a hollow spindle mounted to swing thereon, a removable pin for holding the spindle in pivotal connection with the axle casing, a stub shaft turning in the hollow spindle and having a universal joint connection with the shaft, a wheel mounted to turn on the hollow spindle and connected to the stub shaft, a braking member on the wheel, a braking member on the hollow spindle, and a pivot pin for the braking member on the hollow spindle, said pivot pin interlocking with a removable pivot pin on which the hollow spindle turns.

4. In combination, an axle casing, a hollow spindle mounted to turn thereon and provided with a surrounding flange and a tubular boss, a removable pivot pin extending through said tubular boss for holding the spindle in pivotal connection with the axle casing, a shaft in said axle casing, a stub shaft turning in the hollow spindle and having a universal joint connection with the shaft, a wheel mounted to turn on the hollow spindle and connected to the stub shaft, a braking surface on the wheel, a braking member, and a pivot pin on which said braking member is mounted, said pin extending through the surrounding flange, the boss and the removable pin which holds the hollow spindle to the axle casing.

5. In combination, an axle casing, a hollow spindle mounted to turn thereon and provided with a slotted hollow boss, a removable pin for holding the spindle in pivotal connection with the axle casing and provided with a slotted end, a stub shaft turning in the hollow spindle and having universal connection with the shaft, a wheel mounted to turn on the hollow spindle and connected to the stub shaft, a braking surface on the wheel, a braking surface movably mounted on the hollow spindle, and means for moving the movable braking surface into coöperation with the braking surface on the wheel comprising a rotary pin extending through the hollow boss and the slotted end of the first named removable pin, and an arm secured to said rotary pin to operate within the slotted boss and the slotted end.

JOHN F. FROMM.